(12) United States Patent
Kumar et al.

(10) Patent No.: US 8,036,921 B2
(45) Date of Patent: Oct. 11, 2011

(54) SYSTEM AND METHOD FOR OPTIMIZATION PROCESS REPEATABILITY IN AN ON-DEMAND COMPUTING ENVIRONMENT

(75) Inventors: Tarun Kumar, Ossining, NY (US); Gyana R. Parija, Poughkeepsie, NY (US); Haifeng Xi, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1662 days.

(21) Appl. No.: 10/942,040

(22) Filed: Sep. 16, 2004

(65) Prior Publication Data
US 2006/0058991 A1    Mar. 16, 2006

(51) Int. Cl.
*G06Q 10/00* (2006.01)
(52) U.S. Cl. .................................................. 705/7.11
(58) Field of Classification Search .................. 705/7.11
See application file for complete search history.

(56) References Cited

U.S. PATENT DOCUMENTS

| | | | |
|---|---|---|---|
| 5,809,490 A * | 9/1998 | Guiver et al. .................. | 706/16 |
| 6,863,023 B2 * | 3/2005 | Burghardi et al. ......... | 119/51.02 |
| 6,952,688 B1 * | 10/2005 | Goldman et al. ................ | 706/45 |
| 6,963,826 B2 * | 11/2005 | Hanaman et al. .................. | 703/2 |
| 7,003,475 B1 * | 2/2006 | Friedland et al. .................. | 705/9 |
| 7,092,863 B2 * | 8/2006 | Goldman et al. ................ | 703/13 |
| 7,461,040 B1 * | 12/2008 | Goldman et al. ................ | 706/45 |
| 2004/0162712 A1 * | 8/2004 | Van Rhee ......................... | 703/11 |
| 2005/0004831 A1 * | 1/2005 | Najmi et al. .................... | 705/10 |
| 2006/0161403 A1 * | 7/2006 | Jiang et al. ......................... | 703/2 |

OTHER PUBLICATIONS

François M. Hemez1 and Scott W. Doeblin, "Model Validation and Uncertainty Quantification" A Special Session of the SD-2000 (Structural Dynamics 2000) Forum, Proceedings of IMAC-XIX, the 19th International Modal Analysis Conference. Feb. 5-8, 2001, Kissimmee, Florida.*

François M. Hemez and Scott W. Doeblin, "Model Validation and Uncertainty Quantification" A Special Session of the SD-2000 (Structural Dynamics 2000) Forum, Proceedings of IMAC-XIX, the 19th International Modal Analysis Conference. Feb. 5-8, 2001, Kissimmee, Florida.*

John M. Mulvey; Robert J. Vanderbei; Stavros A. Zenios "Robust Optimizatio~I of Large-Scale Systems" Operations Research, vol. 43, No. 2 (Mar.-Apr. 1995), 264-28 1.*

* cited by examiner

*Primary Examiner* — Romain Jeanty
*Assistant Examiner* — Mark A Fleischer
(74) *Attorney, Agent, or Firm* — McGinn Intellectual Property Law Group, PLLC

(57) ABSTRACT

A method (and system) of providing optimization repeatability in an on-demand computing environment removes variability in an optimization model instance and can be exemplarily implemented in a service architecture. The method and system receives a plurality of physical data instances, which are different representations of the same logical data model, and transforms the plurality of physical data instances into a normalized physical data instance, which can be combined with an optimization model to form a unique optimization model instance, thereby providing repeatability in solving optimization problems.

15 Claims, 10 Drawing Sheets

500

510

SYSTEM AND METHOD FOR OPTIMIZATION PROCESS REPEATABILITY IN AN ON-DEMAND COMPUTING ENVIRONMENT

BACKGROUND OF THE INVENTION

1. Field of the Invention

The present invention generally relates to a method and system for providing optimization process repeatability in on-demand computing environments, and more particularly to a method and system for removing variability in an optimization model instance.

The present invention provides an innovative data transformation technique that enables repeatability of optimization processes, and a service based architecture analytical framework that allows the data transformer to be easily reused, updated, and extended to the user or a plurality of users. An exemplary problem solved by the invention, e.g., optimization process repeatability, has not been addressed by application vendors or off-the-shelf solver vendors.

2. Description of the Related Art

FIG. 1 illustrates a typical optimization system 100. Such processes are concerned with those business optimization problems that can be formulated as mathematical programming models solvable by off-the-shelf solvers such as CPLEX.

As illustrated in FIGS. 1 and 2, in conventional optimization systems 100 and 200, when a business user initiates an optimization run using a specific logical data model 1, the data representation component 2 creates a physical representation (i.e., a physical data instance 3) of the logical data model 1 and feeds the physical data instance 3 into the optimization application 5. In the optimization application 5, the physical data instance 3 is combined (e.g., using combiner 12) with an optimization model 11 to yield an optimization model instance that can be solved by the underlying off-the-shelf solver 7 to determine an optimization result 4. The off-the-shelf solver 7 runs on top of an operating system 8, which runs on top of hardware 9.

A first vendor (e.g., Vendor A), or another vendor, generally controls the data representation component 2 and access to the logical data models 1. On the other hand, a second vendor (e.g., a different vendor, such as Vendor B, which may be a data integration vendor) generally is responsible for the optimization application 5.

With respect to the data representation component 2, logical data models 1 (e.g., raw data) are subjected to filtering and transformation by this component in order to be converted into a format that can be used by the optimization application (for example, a list of fires and parameters about each fire, a list of fire-fighting resources that can be applied to each fire, cost of resources etc.), each stored in a programming language specific data structure.

In the conventional methods, given the same logical data model 1, this data representation component 2 will often generate a different physical data instance $3a$-$3n$ each time it is invoked. For example, when Vendor B (e.g., data integration vendor) implements the data representation component, they use HashMap, a common data structure in modern programming languages, to store the list of fires. However, because of the fundamental way a HashMap is implemented, the same list of fires often end up with different HashMap representations, during different runs of the data transformation component 2, in terms of the natural order in which the fires appear in the HashMap.

For business consistency purposes and from a business user's point of view, given the same logical data model 1 and similar hardware/software computing environments 6, the same optimization result is desirable, and indeed, ideally would be expected because "optimization repeatability" is an important factor that impacts customer acceptance.

However, the conventional methods have not been capable of providing such desirable optimization repeatability, which may lead to business decisions that cannot be sustained over a period of time, which may in turn lead to loss of business value for the enterprise.

SUMMARY OF THE INVENTION

In view of the foregoing, and other, exemplary problems, drawbacks, and disadvantages of the conventional systems, an exemplary feature of the present invention provides a method and system in which optimization process repeatability is improved in on-demand computing environments. Another exemplary feature of the present invention provides a method and system in which variability in an optimization model instance is removed.

In the present application, "CPLEX" is a product line of ILOG, Inc. of Gentilly, France, that provides high-performance optimizers for solving linear programming, quadratic programming, quadratically constrained programming and mixed integer programming problems.

Moreover, "optimization repeatability" defines the concept that, given the same logical data model and similar hardware/software computing environments, the same optimization result may be expected (e.g., is always expected).

One illustrative, non-limiting embodiment of the invention relates to a method of providing optimization repeatability in on-demand computing environments, including removing variability in an optimization model instance.

In another exemplary aspect of the invention, the method of providing optimization repeatability in on-demand computing environments by removing variability in the optimization model instance, includes receiving a plurality of physical data instances and generating a normalized physical data instance from the plurality of physical data instances.

In another exemplary aspect of the invention, the normalized physical data instance can include a unique ordering of data elements. Also, at least one data element of the unique ordering of data elements can include a collection of objects, which is sorted by a predetermined object attribute.

In another exemplary aspect of the invention, the method of unique ordering of data elements can include a hierarchical ordering, such as a TreeMap structure, among others.

In another exemplary aspect of the invention, the method can also include determining the optimization model instance based on an optimization model and the normalized physical data instance.

In another exemplary aspect of the invention, the method also can include providing a plurality of solvers and selecting one of the plurality of solvers based on the optimization model instance.

In another exemplary aspect of the invention, the method can include removing variability in the optimization model instance by generating a single unique normalized physical data instance from a plurality of physical data instances. The method also can include removing variability in the optimization model instance and determining the optimization model instance by combining the single unique normalized physical data instance with an optimization model.

In another exemplary aspect of the invention, the optimization model instance can include a reproduced optimized model instance, a unique optimized model instance, or a unique mathematical programming system format input file.

In another exemplary aspect of the invention, a method for on-demand computing environments, includes receiving a plurality of physical data instances, transforming the plurality of physical data instances into a normalized physical data instance, and obtaining an optimization model instance based on an optimization model and the normalized physical data instance.

In another exemplary aspect of the invention, a system of providing optimization repeatability in on-demand computing environments, includes a data transformer that removes variability in an optimization model instance.

In an exemplary system of providing optimization repeatability in on-demand computing environments, the data transformer includes a receiver that receives a plurality of physical data instances and a generator that generates a normalized physical data instance from the plurality of physical data instances.

In another exemplary aspect of the invention, the system can include a determiner that receives the normalized physical data instance from the data transformer and determines the optimization model instance, based on an optimization model and the normalized physical data instance.

In another exemplary aspect of the invention, the normalized physical data instance includes a unique ordering of data elements.

In another exemplary aspect of the invention, the uniquely ordered data elements can include a collection of other objects, which, in turn, are sorted by a predetermined object attribute.

The unique ordering of data elements can include a hierarchical ordering, such as a TreeMap structure.

In another exemplary aspect of the invention, the data transformer removes variability in the optimization model instance and generates a single unique normalized physical data instance from a plurality of physical data instances.

In another exemplary aspect of the invention, the system further includes a determiner that determines the optimization model instance based on the single unique normalized physical data instance and an optimization model.

An exemplary system can include an optimization model instance including a reproduced optimized model instance, a unique optimized model instance, and a unique mathematical programming system format input file.

In another exemplary aspect of the invention, a system of providing optimization repeatability in on-demand computing environments, includes a receiver that receives a plurality of physical data instances, a transformer that transforms the plurality of physical data instances into a normalized physical data instance, and a determiner that determines an optimized model instance based on an optimization model and the normalized physical data instance.

In another exemplary aspect of the invention, the system further includes a solver that receives the optimization model instance from the determiner and determines optimization based on the optimization model instance.

In another exemplary aspect of the invention, the system further includes a plurality of solvers, wherein one of the plurality of solvers is selectable for receiving the optimization model instance from the determiner based on the optimization model instance.

In another exemplary aspect of the invention, a system of providing optimization repeatability in on-demand computing environments includes means for receiving a plurality of physical data instances and generating a normalized physical data instance from the plurality of physical data instances, and means for determining a unique optimization model instance based on the normalized physical data instance and an optimization model.

Another exemplary aspect of the invention relates to a signal-bearing medium tangibly embodying a program of machine-readable instructions executable by a digital processing apparatus to perform a method of providing optimization process repeatability in on-demand computing environments, the method including removing variability in an optimization model instance.

In another exemplary aspect of the invention, a method of deploying computing infrastructure in which computer-readable code is integrated into a computing system, and combines with the computing system to perform a method for providing optimization process repeatability in on-demand computing environments, the method includes removing variability in an optimization model instance.

In another exemplary aspect of the invention, the removing variability in the optimization model instance includes providing a plurality of services including at least one of an optimization service, a data transformation service, and a solver service.

One advantage of the present invention is that it can provide (e.g., guarantees) a unique ordering of data elements in the physical data instance, such that, when combined with the optimization model, the resulting model instance will correspond to a unique mathematical programming system format input file.

In another exemplary aspect of the invention, a data transformer normalizes the physical data instances so that only a single, unique normalized physical data instance is combined with the optimization model, thereby arriving at only a single, unique optimization model instance that is used to run through the solver.

Thus, the same result for the same logical data model can be provided (e.g., guaranteed) under similar computing environments, irrespective of when the optimization method or system is run. In this way, among others, the present invention is capable of providing excellent optimization repeatability, which cannot be provided by the conventional methods and systems of optimization.

Moreover, in the present invention, the data transformation technique can be easily reused and extended to a plurality of users. That is, the same data normalization functionality can be reused by different optimization services, and it can be enhanced or extended without affecting the optimization services by wrapping different off-the-shelf solvers against a common service interface. Thus, the present invention provides a scaleable and reusable framework.

With the unique and unobvious features of the present invention, a novel method is provided for achieving optimization process repeatability in on-demand computing environments, and more particularly, to a method and system for removing variability in an optimization model instance.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
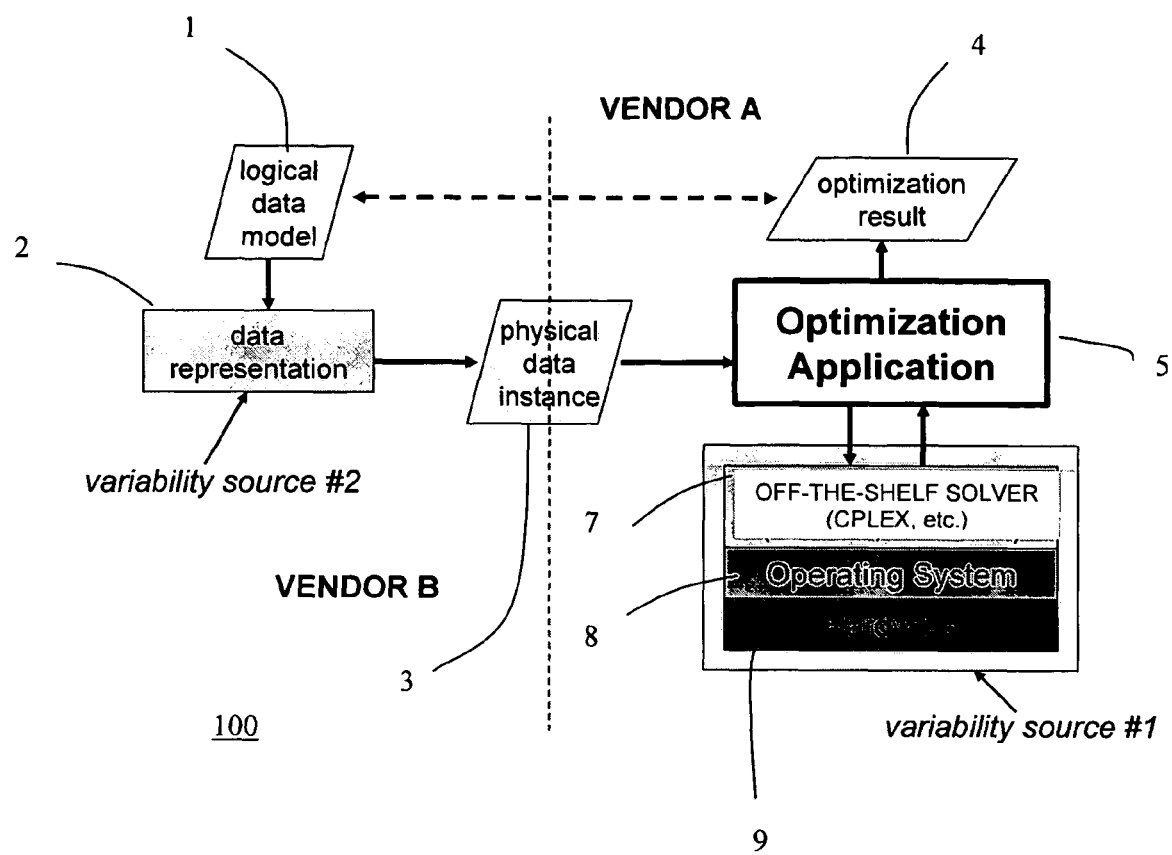
FIG. 1 illustrates a conventional optimization system 100 at a high level.

Referring now to the drawings, and more particularly to FIGS. 3-11, there are shown exemplary embodiments of the method and systems according to the present invention.

The inventors have discovered several problems with the conventional methods. For example, according to the convention optimization systems 100 and 200, as shown in FIGS. 1 and 2, there exists a problem that the same logical data model 1 can produce varying results under different circumstances, which fails to provide the desired optimization repeatability.

The inventors have carefully and extensively investigated such variations and have discovered several sources for such variability.

Figure 2:
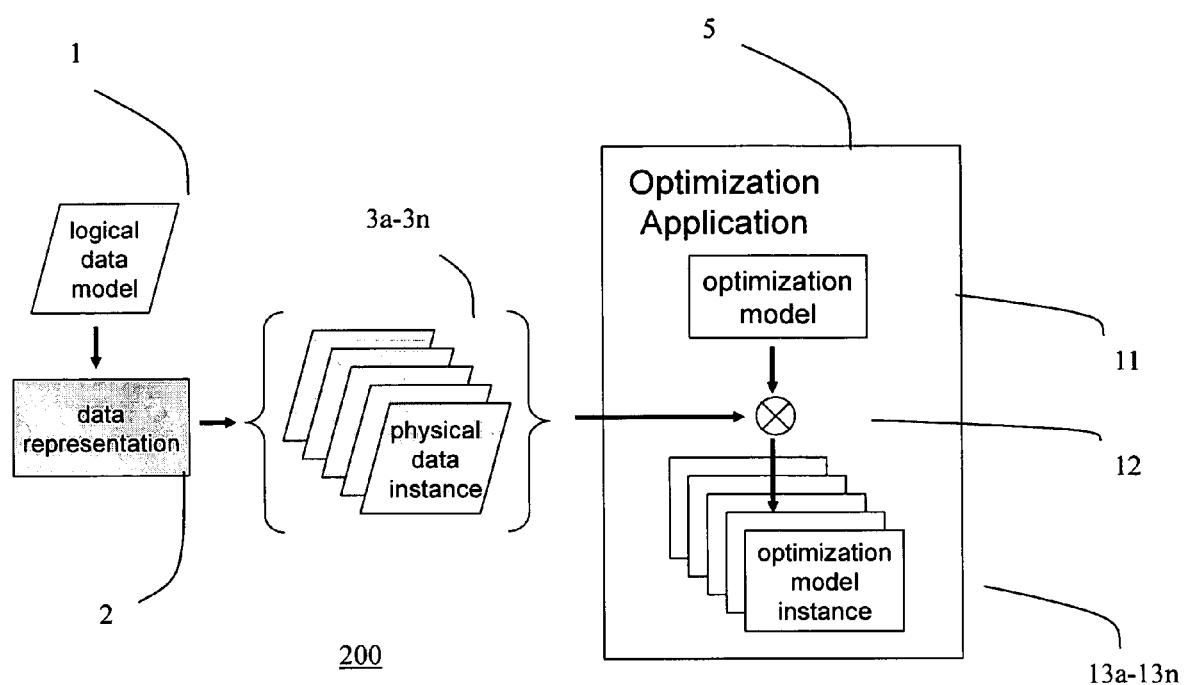
FIG. 2 illustrates a conventional optimization system 200 in more detail.

For example, the inventors have discovered that one source of the variability includes the data representation component 2, as illustrated in FIGS. 1 and 2. Another source of the variability discovered by the inventors includes the off-the-shelf solver 7 and its running environment, as illustrated in FIGS. 1 and 2.

In the conventional methods, given the same logical data model 1, the data representation component 2 will often generate a different physical data instance 3a-3n each time it is invoked.

For example, when Vendor B (e.g., data integration vendor) implements the data representation component, they use HashMap, a common data structure in modern programming languages, to store a list of fires (e.g., for evaluating fire-fighting resources in an exemplary application). However, because of the fundamental way a HashMap is implemented, the same list of fires often end up with different HashMap representations, during different runs of the data transformation component 2, in terms of the natural order in which the fires appear in the HashMap.

Apparently, there is a problem with this first source of variability, when the optimization application retrieves information from the physical data instance 3, it gets a different order (i.e., a different retrieval order). That is, the conventional methods result in a different retrieval order each time.

Thus, the sum of the physical data instance 3 (e.g., physical data instances 3a-3n) and the optimization model 11 will be different each time, resulting in different optimization model instances 13a-13n. Therefore, repeatability cannot be provided or guaranteed by the conventional methods.

For example, if a user needs a set of fires (e.g., for evaluating fire-fighting resources in an exemplary application), such as fires A through N, then fires A through N would be selected. However, depending on the specific programming language data structure chosen to represent this set of fires, variability can be produced.

That is, in the list of fires, each fire may have a different identification and there can be multiple different ways of representing them in terms of their relative orders in the list. If the programming artifact is chosen in such a way that the order of the fires is not guaranteed every time one represents the fires, then a different physical data instance 3 of the corresponding logical data model 1 will result each time (e.g., physical data instances 3a-3n will result) and the elements will appear in a different sequence or order each time, thereby producing undesirable variability.

Generally, the data representation 2 used by Vendor B cannot be controlled, since Vendor B usually includes an outside vendor (e.g., a data integration vendor) or government agency. That is, Vendor A and Vendor B generally are not controlled by the same party. Instead, Vendor B usually is a data integration vendor that has a close relationship with the customer. Thus, it generally is not possible to control the data representation 2.

Therefore, since the data representation 2 cannot be controlled, there will be multiple physical data instances 3a-3n passed to the optimization application 5. Each physical data instance 3a-3n then is combined with the optimization model 11, resulting in multiple physical model instances 13a-13n being passed to the solver 7. As such, the result of the solver 7 will be different and repeatability cannot be provided or guaranteed.

Since the data representation 2 used by Vendor B (e.g., data integration vendor) generally cannot be controlled, inventors have discovered that one way to solve the problem with repeatability is to focus on how to remove the variability problems with the optimization application 5, which is a far more detailed and complex problem than controlling the data representation 2.

The inventors also have discovered another source of variability, e.g., the off-the-shelf solver 7, which is used to solve the optimization problem using, for example, integer programming or linear programming. The off-the-shelf solver 7 runs on top of the operating system 8, which in turn, runs on top of the hardware 9. In this case, variability can result due to, for example, floating point implementation in the operating system or the hardware which can affect the "path" that the off-the-shelf solver 7 chooses to arrive at an optimal solution. Generally, in the conventional methods and systems (e.g., as shown in FIGS. 1 and 2), there is a problem that the off-the-shelf environment cannot be controlled, nor is it possible to compensate for the associated variability in the optimization application.

What is desired then, is an optimization method or system that provides the same (or substantially the same) result, under similar computing environments, no matter when the optimization method or system is run, thereby providing excellent repeatability. The conventional methods and system (e.g., as shown in FIGS. 1 and 2) cannot provide the desired repeatability that is achieved by the method and system according to the present invention.

Another problem with conventional methods and systems is that, for certain applications, it is necessary to deploy information to each individual user in order to upgrade the system. That is, whenever an upgrade is needed, it is necessary to separately upgrade each service and deploy it to each individual user.

The conventional methods and systems cannot provide the desired repeatability that is achieved by the method and system according to the present invention. That is, the conventional methods and systems cannot provide optimization repeatability (e.g., the same result), no matter when the optimization method or system is run.

The inventors have discovered that the corresponding variability, resulting from the problems set forth above, can be offset through innovative measures in the optimization application and have provided a novel and unobvious method and system for achieving the desired repeatability. The present invention solves the problems of the conventional optimization processes and systems, and provides the excellent optimization repeatability, no matter when the optimization method or system is run.

Figure 3:
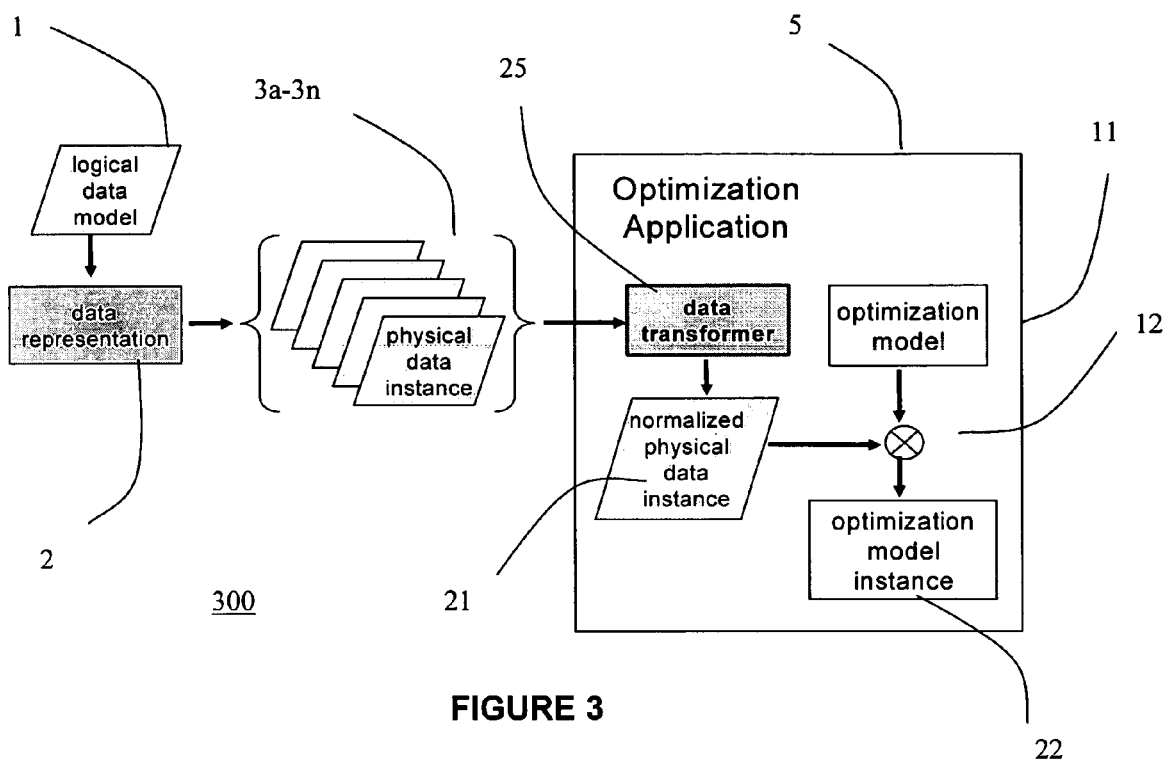
FIG. 3 illustrates an exemplary, non-limiting embodiment of a system 300 according to the present invention.

To negate the effect of data representation variability, one aspect of the present invention, as illustrated in the system 300 of FIG. 3, introduces a data transformer 25 (e.g., a data normalization module, or data transformation module) in the optimization application 5 that transforms all physical data instances 3a-3n corresponding to the same logical data model 1 into one normalized physical data instance 21. The transformation algorithm employed by the data transformer 25 helps to provide (e.g., guarantee) a unique ordering of data elements in the normalized physical data instance 21. Thus, when the normalized physical data instance 21 is combined (e.g., by the combiner 12) with the optimization model 11, the resulting optimization model instance 22 will correspond to a unique mathematical programming system format input file.

As illustrated in FIG. 3, a data transformer 25 is used to normalize the plurality of physical data instances 3a-3n to be combined with the optimization model 11, thereby helping to provide (e.g., providing a 100% guarantee) that a unique optimization model instance 21 will result from the combination.

More particularly, the present invention introduces a data transformer 25 to normalize the plurality of physical data instances 3a-3n so that one (e.g., only one or a single) normalized physical data instance 21 (e.g., a single, unique normalized physical data instance) is combined with the optimization model 11, thereby arriving at a single, unique optimization model instance 22 that is used to run through the solver 7, which may provide (e.g., guarantee) the same result for the same logical data model 1 irrespective of when the optimization method or system is run.

Thus, the present invention is capable of providing excellent repeatability, which cannot be provided by the conventional methods and systems of optimization.

The data transformer 25 according to an exemplary embodiment of the present invention makes use of the data elements that appear in a given sequence. Also, for any data element that is a collection of objects, the collection can be sorted by a certain or predetermined object attribute.

In other words, the data transformer 25 can achieve its functionality by providing (e.g., ensuring or guaranteeing) the following qualities in the normalized physical data instance 21.

First, the data transformer 25 provides (e.g., ensures or guarantees) that the data elements appear in a given order or sequence, including those that are a collection (e.g., a set, list, array, etc.) of other objects.

Second, the data transformer 25 sorts the contained objects by a certain object attribute collections, which by their very nature introduce variability when being traversed via built-in iteration methods (e.g., HashMap), and replaces such object attribute collections with "variability free" collections (e.g., TreeMap).

For example, if the physical data instances include a list of fires (e.g., for evaluating fire-fighting resources), each fire can have a different identification and can be represented in multiple different ways based on the programming artifact being used.

If the list of fires is represented in such a way that the order of the list is not guaranteed every time one represents the list in a programming artifact, as in the conventional methods, then there will be a different physical instance of that logical data model each time, and the elements of the data will appear in a different sequence each time. The present invention avoids such a chaotic ordering.

In one exemplary aspect of the present invention, the data elements, such as fire information, fire-fighting resource information, cost information, etc., each can be treated like a data element so that the order in which they appear in the model should be a unique order or sequence. In this way, the present invention can provide (e.g., guarantee) the retrieval order.

In addition, the present invention looks at each of the contained elements in collection data elements such as fires, which means that fires have internal elements or a collection of contained elements, and further, that each of these elements in the collection has a guaranteed retrieval order or sequence.

Thus, the present invention can provide (e.g., ensure or guarantee) the retrieval order.

For example, one exemplary embodiment of the invention recites the data structure using a hierarchical tree (e.g., TreeMap), which is one possible structure that can provide (e.g., guarantee) the retrieval order. Hence, the TreeMap data structure is a hierarchical tree. Thus, the order of retrieval can be provided (e.g., guaranteed) to be the same every time (e.g., an ascending or descending order each time).

Those skilled in the art will recognize that other data structures, in addition to a hierarchical tree (e.g., TreeMap), can be used to provide (e.g., ensure or guarantee) the retrieval order, within the spirit and scope of the appended claims. The inventors' intent is to encompass equivalents of such data structures.

Figure 4:
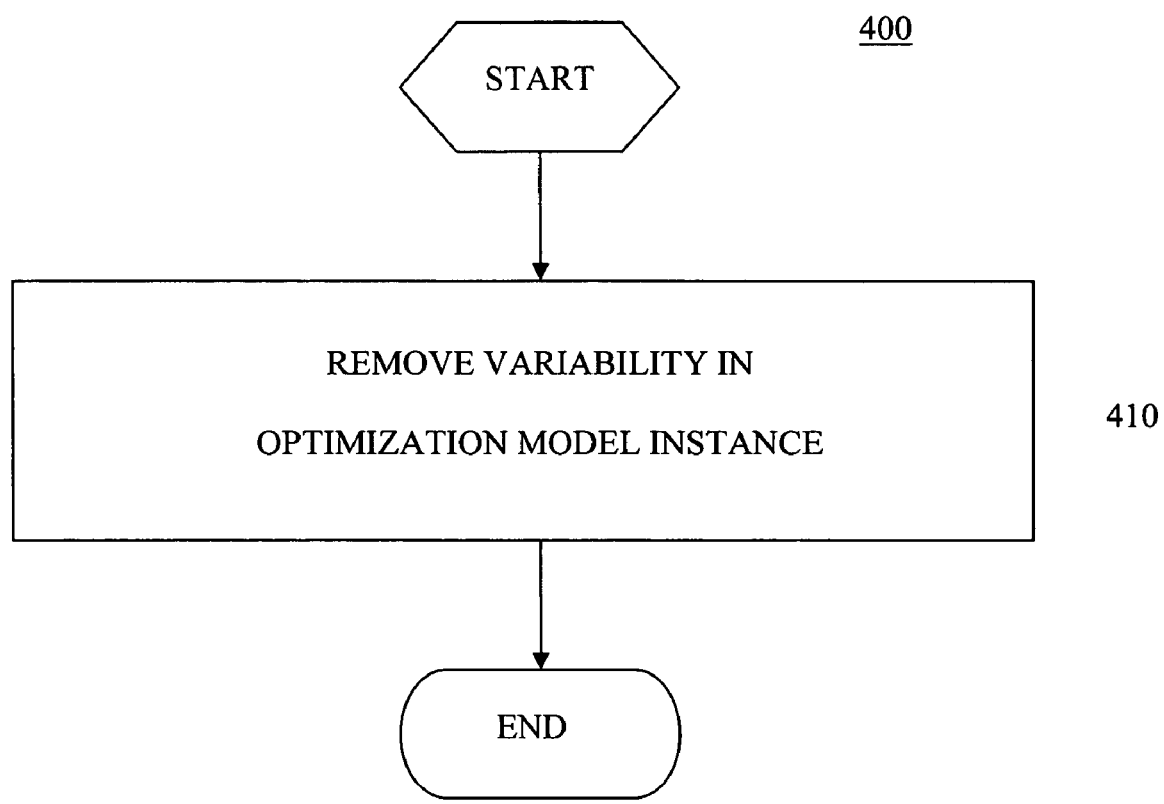
FIG. 4 illustrates a flowchart of a method 400 according to an exemplary, non-limiting embodiment of the present invention.

FIG. 4 illustrates a method 400 of removing variability in an optimization model instance (e.g., step 410), according to an exemplary embodiment of the present invention.

Figure 5:
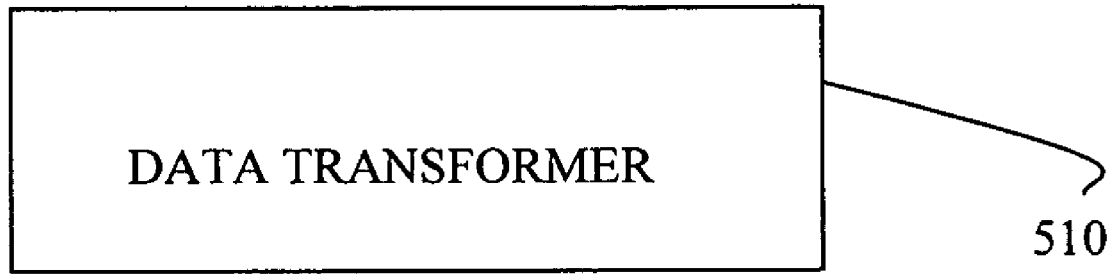
FIG. 5 illustrates another exemplary, non-limiting embodiment of a system 500 according to the present invention.

As illustrated in the system 500 of FIG. 5, a data transformer 510 removes the variability in an optimization model instance, according to an exemplary embodiment of the present invention.

Figure 6:
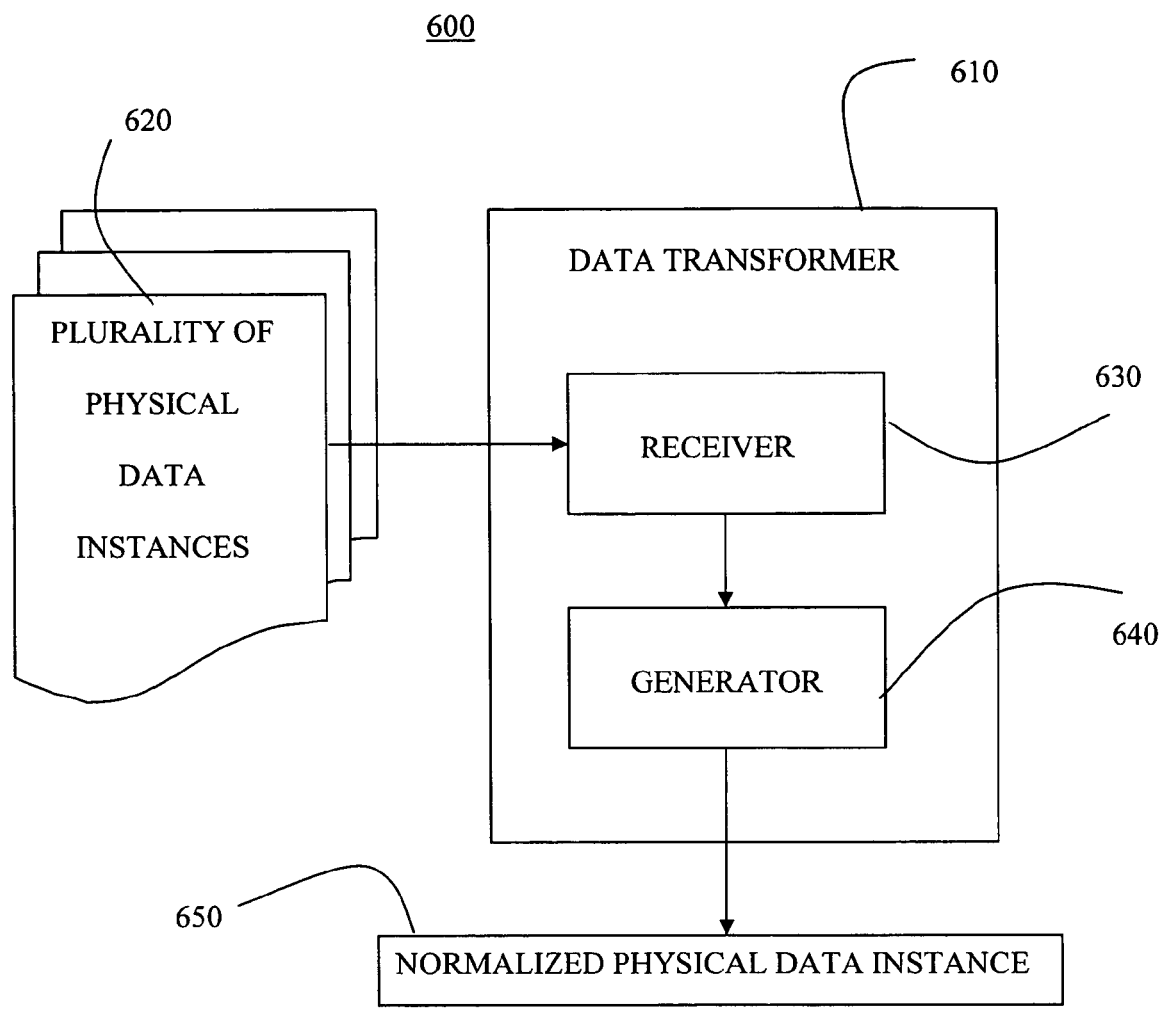
FIG. 6 illustrates another exemplary, non-limiting embodiment of a system 600 according to the present invention.

As illustrated in the exemplary system 600 of FIG. 6, a plurality of physical data instances 620 (e.g., from a data integration vendor or government agency, etc.) are received by a receiver 630 of the data transformer 610.

A generator 640 of the data transformer 610 generates a normalized physical data instance 650 (e.g., a single, unique normalized physical data instance) from the plurality of physical data instances 620.

Figure 7:
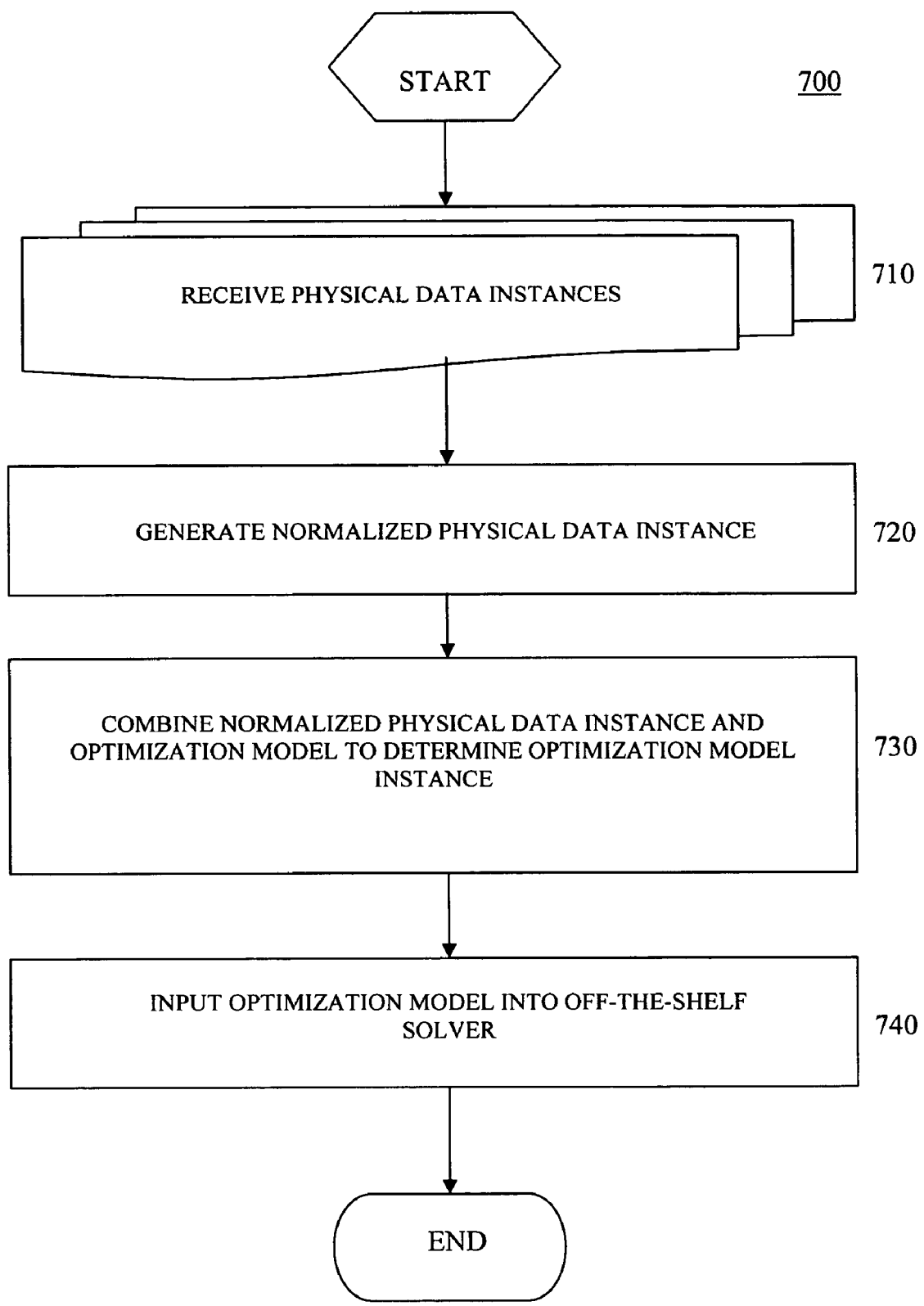
FIG. 7 illustrates a flowchart of a method 700 according to an exemplary, non-limiting embodiment of the present invention.

As illustrated in the exemplary method 700 of FIG. 7, in step 710, a plurality of physical data instances (e.g., from a data integration vendor or government agency) are received (e.g., by a data transformer).

Next (e.g., step 720), a normalized physical data instance (e.g., a single, unique normalized physical data instance) is generated from the plurality of physical data instances.

Further (e.g., step 730), the normalized physical data instance is combined with an optimization model to determine an optimization model instance (e.g., a single, unique optimization model instance).

The optimization model instance is input into the off-the-shelf solver (e.g., step 740).

Figure 8:
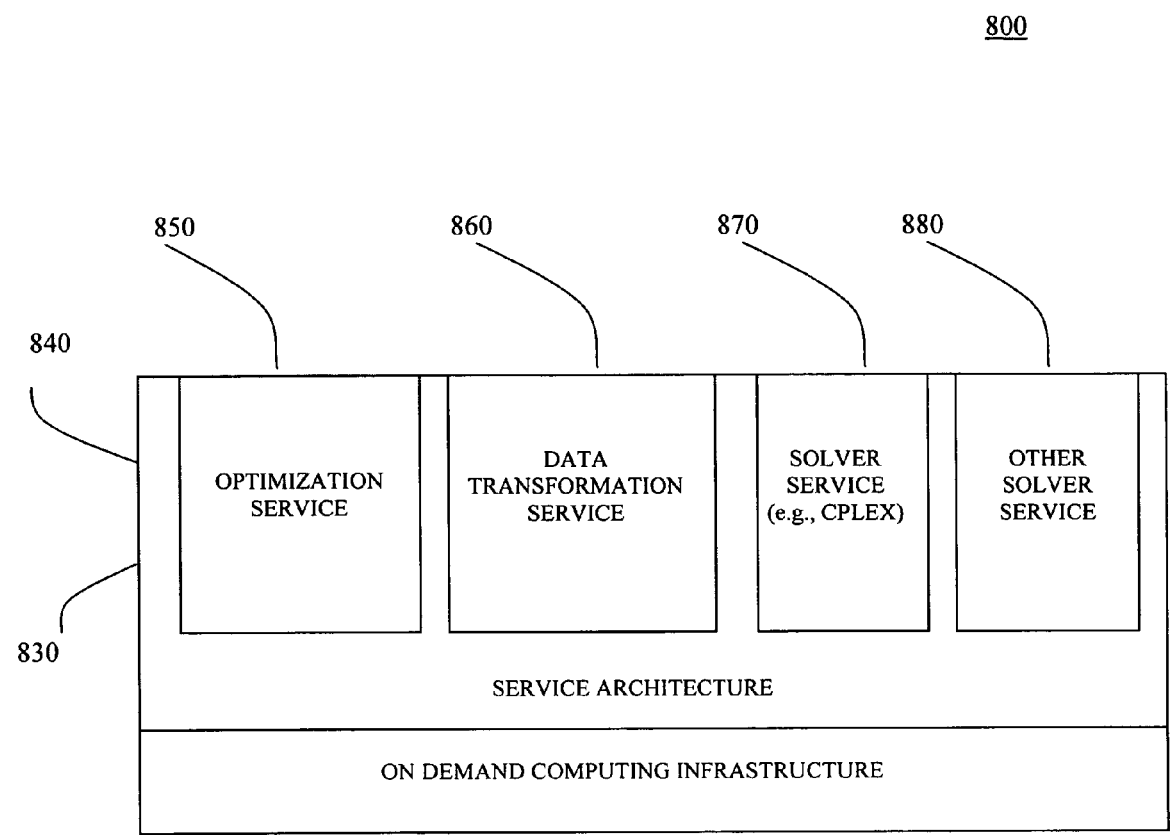
FIG. 8 illustrates another exemplary, non-limiting embodiment of a system 800 according to the present invention.

On the other hand, as illustrated in the exemplary system 800 of FIG. 8, the unique optimization method according to the present invention for providing repeatability of the optimization process can be implemented in a service architecture 840 that is reusable in other similar projects. That is, the service architecture based framework (e.g., service architecture 840) allows the data transformation technique to be easily reused and extended to a plurality of users at a single time.

The advantages of such a framework, among others, are that the same data normalization functionality can be reused by different optimization services (e.g., optimization service 850, data transformation service 860, CPLEX solver service 870, and/or off-the-shelf solver service 880), and it can be enhanced or extended without affecting the optimization services by wrapping different off-the-shelf solvers (e.g., CPLEX solver service 870, off-the-shelf solver service 880, etc.) against a common service interface. In this way, solver behaviors can be transparently enhanced and standardized.

In general, an exemplary embodiment of the present invention includes three layers, as illustrated in the system 800 of FIG. 8.

First, the present invention includes an underlying on-demand computing infrastructure 830, which is a hybrid of hardware, software, and middleware. It is noted that in the present invention, the computing resources can be virtualized. That is, the location of the resources is irrelevant and can be provided on an on-demand basis.

Second, the present invention includes service architecture 840, which is a message driven computing framework, on top of which can be plugged various services (e.g., optimization service 850, data transformation service 860, CPLEX solver service 870, and off-the-shelf solver service 880, among others).

In the conventional methods and systems, for certain applications it would be necessary to deploy information to every user in order to upgrade the system. That is, whenever an upgrade is needed, it would be necessary to upgrade every single piece and separately deploy it to the users.

With the service architecture 840 according to the present invention, the upgraded information would become available to everyone who has access to the services.

Thus, when an upgrade to any of the services is necessary, the specific service (e.g., the optimization service 850, data transformation service 860, CPLEX solver service 870, and off-the-shelf solver service 880) can be upgraded one time and can be simultaneously made available to every user who has access to the service.

With the method and system according to another embodiment of the present invention, the public service (e.g., only the public service), such as the optimization service 850, may be visible to the user. That is, from the user's perspective, the user need only provide a description of the specification of the optimization model, the data, and/or the method of the operating system. The data transformation service 860 (e.g., by implanting the data transformer 25) will normalize the data received (e.g., physical data instances 3*a*-3*n*), for example, from a user.

One of the benefits of the present invention is that it is possible to configure the services so that the user can selectively specify which type of solver 7 the user wants to use.

In another exemplary embodiment of the invention, the solver selection process can be transparent to the user such that the operating system will automatically choose the most appropriate solver (e.g., CPLEX solver 870, or off-the-shelf solver 880, etc.) for the user. The operating system also can use (e.g., automatically) the data transformation service 860 (e.g., which implements the data transformer 25) to perform further filtering or transformation of the data without the user knowing it. Again, the user would only need to know the interface to the operating system (e.g., the description of the specification of the optimization model, the data, and/or the method of the operating system). Accordingly, the present invention provides a scaleable and reusable framework.

More particularly, in the exemplary embodiment illustrated by FIG. 8, the optimization service 850 is the optimization application 5 (e.g., see FIG. 3) wrapped as a service. The optimization service 850 receives a plurality of physical data instances (e.g., 3*a*-3*n* of FIG. 3) as input, normalizes the plurality of physical data instances (e.g., 3*a*-3*n* of FIG. 3) by invoking the data transformation service 860 (e.g. the data transformer 25 of FIG. 3 wrapped as a service), and then sends the normalized physical data instance (e.g., 21 of FIG. 3) to an off-the-shelf solver service (e.g., CPLEX solver service 870, off-the-shelf solver service 880, etc.), which is the off-the-shelf solver 7 of FIG. 3 wrapped as a service, for mathematical optimization.

Thus, by incorporating a data transformation service 860 (which includes, e.g., a data transformer 25 of FIG. 3) into an service architecture 840 that provides the benefits described above, the operating system (e.g., operating system 8 of FIG. 1) and the data transformation service (e.g., data transformation service including data transformer 25 of FIG. 3) easily can be extended and upgraded to handle future requirements.

Figure 9:
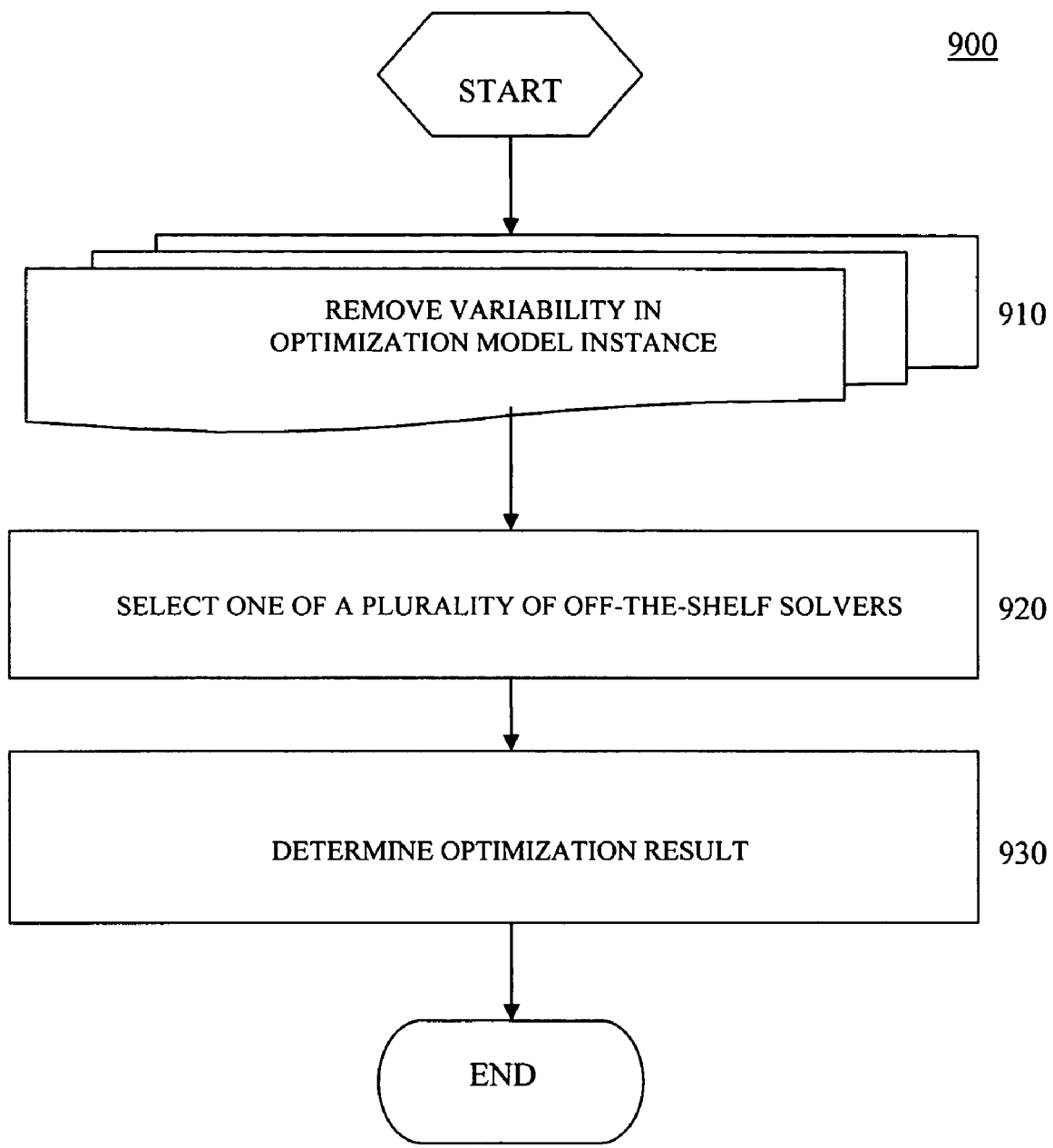
FIG. 9 illustrates a flowchart of a method 900 according to another exemplary, non-limiting embodiment of the present invention.

FIG. 9 illustrates a method 900 of providing optimization repeatability in on-demand computing environments implemented in a service architecture, wherein the method includes removing variability in an optimization model instance.

As illustrated in the method 900 of FIG. 9, in step 910, the variability in an optimization model instance is removed, for example, according to one of the foregoing embodiments of the present invention.

Next (e.g., step 920), one of a plurality of off-the-shelf solvers is selected, either by the user or automatically.

The optimization result is then determined (e.g., step 930) using the selected off-the-shelf solver.

Figure 10:
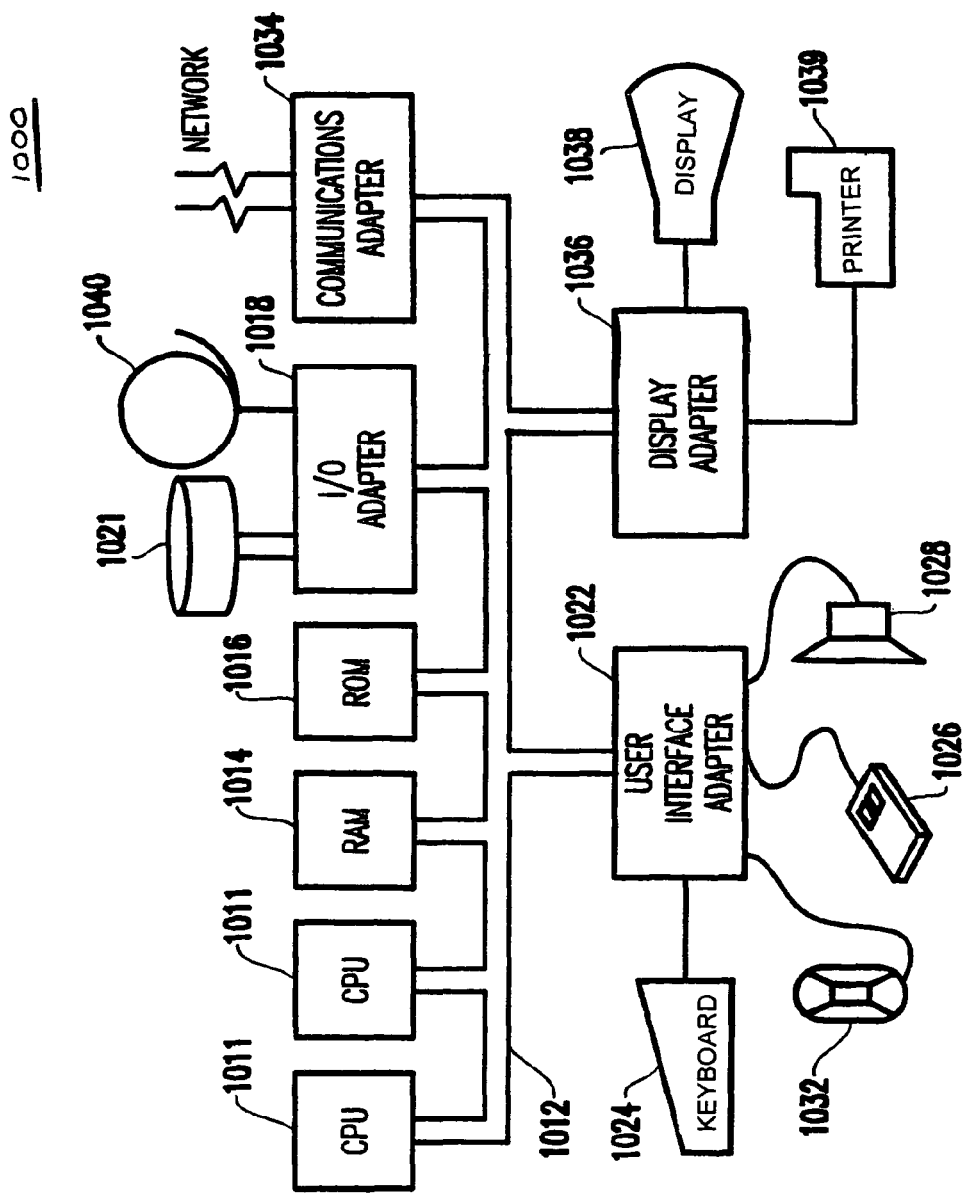
FIG. 10 illustrates an exemplary hardware/information handling system 1000 for incorporating the present invention therein.
Figure 11:
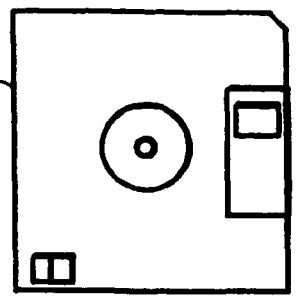
FIG. 11 illustrates a signal bearing medium 1100 (e.g., storage medium) for storing steps of a program of a method according to the present invention.

FIG. 10 illustrates an exemplary hardware/information handling system 1000 for incorporating the present invention therein; and FIG. 11 illustrates a signal bearing medium 1100 (e.g., storage medium) for storing steps of a program of a method according to the present invention.

FIG. 10 illustrates a typical hardware configuration of an information handling/computer system for use with the invention and which preferably has at least one processor or central processing unit (CPU) 1011.

The CPUs 1011 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1026, speaker 1028, microphone 1032, and/or other user interface device to the bus 1012), a communication adapter 1034 for connecting an information handling system to a data processing network, the Internet, an Intranet, a personal area network (PAN), etc., and a display adapter 1036 for connecting the bus 1012 to a display device 1038 and/or printer.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 1011, as represented by the fast-access storage for example. Alternatively, the instructions may be contained in another signal-bearing media, such as a magnetic data storage diskette 1100 (FIG. 11), directly or indirectly accessible by the CPU 1011.

Whether contained in the diskette 1100, the computer/CPU 1011, or elsewhere, the instructions may be stored on a variety of machine-readable data storage media, such as DASD torage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, the illustrative, non-limiting embodiments of the present invention as described above, overcome the problems of the conventional methods and systems, and negate the effect of data representation variability.

One exemplary aspect of the present invention introduces a data transformation (normalization) module in the optimization application that transforms all physical data instances corresponding to the same logical data model into one normalized physical data instance, thereby providing (e.g., guaranteeing) a unique ordering of data elements in the physical data instance. When combined with the optimization model, the resulting model instance will correspond to a unique mathematical programming system format input file. Thus, the same result for the same logical data model can be provided (e.g., guaranteed) irrespective of when the optimization method or system is run.

In this way, among others, the present invention is capable of providing excellent repeatability, which cannot be provided by the conventional methods and systems of optimization.

The data transformer according to an exemplary embodiment of the present invention makes use of the data elements that appear in a given order or sequence. Also, for any data element that is a collection of objects, the collection can be sorted by a certain, or predetermined, object attribute.

In one exemplary aspect of the present invention, the data elements, such as fire information, fire-fighting resource information, cost information, etc., each can be treated like a data element so that the order in which they appear in the model should be a unique order or sequence.

Thus, one exemplary aspect of the present invention can provide (e.g., guarantee) the retrieval order.

In another exemplary aspect of the present invention, a service architecture based framework is provided so that the data transformation technique can be easily reused and extended to a plurality of users.

The advantages of such a framework are that the same data normalization functionality can be reused by different optimization services, and it can be enhanced or extended without affecting the optimization services by wrapping different off-the-shelf solvers against a common service interface. With the service architecture according to this aspect of the present invention, the upgraded information can be made available to everyone who has access to the service. That is, one of the benefits of the present invention is that it is possible to configure services so that the user can selectively specify which type of solver the user wants to use. Thus, the services can be enhanced or extended without affecting the optimization services by wrapping different off-the-shelf solvers against a common service interface. In this way, solver behaviors can be transparently enhanced and standardized.

Thus, by incorporating the data transformer into an off-the-shelf, which provides the benefits described above, the operating system and the data transformation service easily can be extended and upgraded to handle future requirements. Moreover, the unique optimization method for providing repeatability of the optimization process can be implemented in a service architecture that is reusable in other similar projects.

With the unique and unobvious features of the present invention, a novel method is provided for achieving optimization process repeatability in on-demand computing environments, and more particularly, to a method and system for removing variability in an optimization model instance.

While the invention has been described in terms of several preferred embodiments, those skilled in the art will recognize that the invention can be practiced with modification within the spirit and scope of the appended claims.

Further, it is noted that, the inventors' intent is to encompass equivalents of all claim elements, even if amended later during prosecution.

What is claimed is:

1. A method of providing optimization repeatability in an on-demand computing environment, comprising:
   receiving a plurality of physical data instances;
   transforming, using a processor of a computer, the plurality of physical data instances into a single normalized physical data instance; and
   determining optimization model instances by combining said single normalized physical data instance with an optimization model,
   wherein said normalized physical data instance includes a plurality of data elements,
   wherein at least one data element of said plurality of data elements includes a collection of objects,
   wherein said transforming comprises sorting said collection of objects by a predetermined object attribute, and
   wherein said optimization model instances comprise a unique MPS (mathematical programming system) format input file.

2. The method according to claim 1, wherein said plurality of data elements comprises a hierarchical ordering.

3. The method according to claim 2, wherein said hierarchical ordering comprises a TreeMap structure.

4. A method for an on-demand computing environment, comprising:
   receiving a plurality of physical data instances;
   transforming, using a processor of a computer, said plurality of physical data instances into a single normalized physical data instance; and
   obtaining an optimization model instance based on an optimization model and said normalized physical data instance,
   wherein said normalized physical data instance includes a plurality of data elements,
   wherein at least one data element of said plurality of data elements includes a collection of objects,
   wherein said transforming comprises sorting said collection of objects by a predetermined object attribute, and wherein said optimization model instances comprise a unique MPS (mathematical programming system) format input file.

5. A system for providing optimization repeatability in an on-demand computing environment, comprising:
 a receiver that receives a plurality of data instances;
 a data transformer that transforms the plurality of physical data instances into a single normalized physical data instance; and
 a processor configured to determine optimization model instances by combining said single normalized physical data instance with an optimization model,
 wherein said normalized physical data instance includes a plurality of data elements,
 wherein at least one data element of said plurality of data elements includes a collection of objects,
 wherein said data transformer sorts said collection of objects by a predetermined object attribute, and
 wherein said optimization model instances comprise a unique mathematical programming system format input file.

6. The system according to claim 5, wherein said plurality of data elements comprises hierarchical ordering.

7. The system according to claim 6, wherein said hierarchical ordering comprises a TreeMap structure.

8. A system for providing optimization repeatability in an on-demand computing environment, comprising:
 a receiver that receives a plurality of physical data instances;
 a transformer that transforms said plurality of physical data instances into a single normalized physical data instance; and
 a processor comprising a determiner that determines an optimized model instance based on an optimization model and said normalized physical data instance,
 wherein said normalized physical data instance includes a plurality of data elements,
 wherein at least one data element of said plurality of data elements includes a collection of objects,
 wherein said transformer sorts said collection of objects by a predetermined object attribute,
 wherein said optimization model instance comprises a unique MPS (mathematical programming system) format input file.

9. The system according to claim 8, further comprising:
 a solver that receives said optimization model instance from said determiner and determines optimization based on said optimization model instance.

10. The system according to claim 8, further comprising:
 a plurality of solvers,
  wherein one of said plurality of solvers is selectable for receiving said optimization model instance from said determiner and generating an optimal solution based on said optimization model instance.

11. A system for providing optimization repeatability in an on-demand computing environment, comprising:
 means for receiving a plurality of physical data instances and generating a single normalized physical data instance from said plurality of physical data instances;
 a processor comprising means for determining a unique optimization model instance, based on said normalized physical data instance and an optimization model; and
 means for receiving said unique optimization model instance and generating an optimal solution based on said unique optimization model instance,
 wherein said normalized physical data instance includes a plurality of data elements,
 wherein at least one data element of said plurality of data elements includes a collection of objects,
 wherein said means for receiving a plurality of physical data instances and generating a single normalized physical data instance sorts said collection of objects by a predetermined object attribute,
 wherein said optimization model instance comprises a unique MPS (mathematical programming system) format input file.

12. A tangible storage medium embodying a program of machine-readable instructions executable by a digital processing apparatus to perform a method of providing optimization process repeatability in an on-demand computing environment, the method comprising:
 receiving a plurality of physical data instances;
 transforming the plurality of physical data instances into a single normalized physical data instance; and
 determining optimization model instances by combining said single normalized physical data instance with an optimization model,
 wherein said normalized physical data instance includes a plurality of data elements,
 wherein at least one data element of said plurality of data elements includes a collection of objects,
 wherein said transforming comprises sorting said collection of objects by a predetermined object attribute, and
 wherein said optimization model instances comprise a unique MPS (mathematical programming system) format input file.

13. A method of deploying computing infrastructure in which computer-readable code is integrated into a computer processor, and combines with said computer processor to perform a method of providing optimization process repeatability in an on-demand computing environment, said method comprising:
 receiving a plurality of physical data instances;
 transforming the plurality of physical data instances into a single normalized physical data instance; and
 determining optimization model instances by combining said single normalized physical data instance with an optimization model,
 wherein said normalized physical data instance includes a plurality of data elements,
 wherein at least one data element of said plurality of data elements includes a collection of objects,
 wherein said transforming comprises sorting said collection of objects by a predetermined object attribute, and
 wherein said optimization model instances comprise a unique MPS (mathematical programming system) format input file.

14. The method according to claim 13, further comprising:
 simultaneously deploying to a plurality of users of said computing system a change of service of at least one of said plurality of services.

15. The method according to claim 14, wherein said change of service includes at least one of upgrading, removing, altering, and replacing at least one of said plurality of services.

* * * * *